United States Patent [19]
Miselli

[11] Patent Number: 6,092,979
[45] Date of Patent: Jul. 25, 2000

[54] METHOD AND APPARATUS FOR TAKING OVER AND PILING ARTICLES SUPPLIED IN A PLURALITY OF ROWS AND FOR CONVEYING OBTAINED PILES OF ARTICLES TO A PACKAGING LINE

[75] Inventor: Carlo Alberto Miselli, Via Scania, Italy

[73] Assignee: I.M.A. Macchine Automatiche S.p.A., Bologna, Italy

[21] Appl. No.: 09/117,015

[22] PCT Filed: Jan. 17, 1997

[86] PCT No.: PCT/IB97/00036

§ 371 Date: Jul. 21, 1998

§ 102(e) Date: Jul. 21, 1998

[87] PCT Pub. No.: WO97/27108

PCT Pub. Date: Jul. 31, 1997

[30] Foreign Application Priority Data

Jan. 25, 1996 [IT] Italy .................................. BO96A0029

[51] Int. Cl.⁷ ...................................................... B65G 47/26
[52] U.S. Cl. ........................ 414/790.7; 414/802; 198/449
[58] Field of Search ................................. 198/449, 461.2, 198/461.3; 414/801, 790.7, 794.9

[56] References Cited

U.S. PATENT DOCUMENTS

| | | | |
|---|---|---|---|
| 3,306,423 | 2/1967 | Rowlands | 198/449 |
| 3,409,115 | 11/1968 | Porcaro | 198/449 |
| 3,615,001 | 10/1971 | Temple | 198/449 |
| 4,845,921 | 7/1989 | Miselli . | |
| 4,854,440 | 8/1989 | Laube et al. | 198/449 |
| 5,006,040 | 4/1991 | Frey | 414/790.7 |

FOREIGN PATENT DOCUMENTS

| | | |
|---|---|---|
| 1 511 849 | 5/1966 | Germany . |
| 1 275 441 | 8/1968 | Germany . |

*Primary Examiner*—Gregory A. Morse
*Attorney, Agent, or Firm*—Nims, Howes, Collison, Hansen & Lackert

[57] ABSTRACT

The present invention describes an apparatus which carries out a method for taking and piling articles supplied in a plurality of rows for transferring the obtained piles of articles to a packaging line. The articles are moved along at least two working lines arranged side by side and parallel to each other. The articles are piled in piling stations which are staggered apart by a predetermined step. The obtained piles of articles are transferred, also staggered by a predetermined step, to a packaging line where a first conveyer moves the piles from the piling member, to other conveying devices which move the piles to a packaging line in which the piles are arranged in a single row.

8 Claims, 14 Drawing Sheets

METHOD AND APPARATUS FOR TAKING
OVER AND PILING ARTICLES SUPPLIED IN
A PLURALITY OF ROWS AND FOR
CONVEYING OBTAINED PILES OF
ARTICLES TO A PACKAGING LINE

BACKGROUND OF THE INVENTION

The present invention relates to packaging of articles supplied in a plurality of parallel rows, in particular blister packs.

DESCRIPTION OF THE PRIOR ART

There are known, specially in pharmaceutical field, packs commonly called blister packs, formed by a plate with a series of receptacles for containing articles such as capsules, tablets and the like; generally, the plate is closed with a foil, e.g. of aluminium.

Each article is taken out, when needed, by pushing outside the receptacle, and the article contained therein, thus breaking the aluminium foil.

The blister packs are usually obtained from a blister band, which is filled with articles and subsequently closed with the aluminium foil. Then, the blister band is cut into regular portions, corresponding to single blister packs.

Afterwards, these blister packs are suitably piled and moved to a packaging line so as to be inserted into cases.

The said blister band generally allows to form several rows of blisters, parallel to one another, along the same blister band.

After having been filled and closed, these rows are longitudinally separated to allow the transversal division of single blister packs.

The U.S. Pat. No. 4.845.921, owned by the same Applicant, discloses a method and an apparatus for separating single blister packs from a continuous band including several parallel rows and for longitudinal arrangement of the same blister packs for feeding thereof to a packaging line.

According to the mentioned method, all the said parallel rows of the continuous band are divided in blister packs simultaneously and staggered by one step; then the blister packs are arranged transversally during the simultaneous movement for piling and the obtained piles are arranged longitudinally in one single row, for the above mentioned step of packaging in cases.

Therefore, the packaging machine is equipped with cutting means which repeatedly sever single blister packs simultaneously in all the parallel rows. The blister packs of different rows are then staggered by a predetermined step, and fed to the means that pile them forming parallel rows of piles.

In the blister packs packaging machines a problems often occurs which derives from a possible lack of one or more articles along the feeding line, due to rejection of faulty packs or other similar event.

This results is formation of non-complete piles, and subsequently leads unavoidable rejecting the case already filled with the unfinished pile.

DISCLOSURE OF THE INVENTION

The object of the present invention is to propose a method according to which articles supplied in a plurality of rows and piled are brought to further packaging steps only when a complete pile of articles is formed, even if one or more articles were missing in the feeding step, without interruption of the normal operating cycle of the packaging line.

It is a further object of the invention to provide an apparatus which carries out the above mentioned method.

The above mentioned objects are obtained in accordance with the invention, by means of a method for taking over and piling articles supplied in a plurality of rows and for transferring obtained piles of articles to a packaging line, which includes the following steps:

moving the articles to be packaged along at least two working lines arranged side by side and parallel to each other;

piling said articles in related piling stations which are staggered by a predetermined step;

transferring the obtained piles of articles, also staggered by one step, to a packaging line, where they are arranged in one single row.

Accordingly, an apparatus which carries out the method includes:

at least two working lines, arranged parallel and side by side, provided with means for feeding the articles to be packaged and with means for piling the articles, acting in related piling stations which are staggered by a predetermined step;

means for conveying obtained piles of articles, also staggered by one step, to a packaging line where they are arranged in one single row, only when a pile of articles has been completed.

BRIEF DESCRIPTION OF THE DRAWINGS

The characteristic features of the invention are pointed out in the following description, with particular reference to the enclosed drawings, in which.

BEST MODE OF CARRYING OUT THE INVENTION

Figure 1:
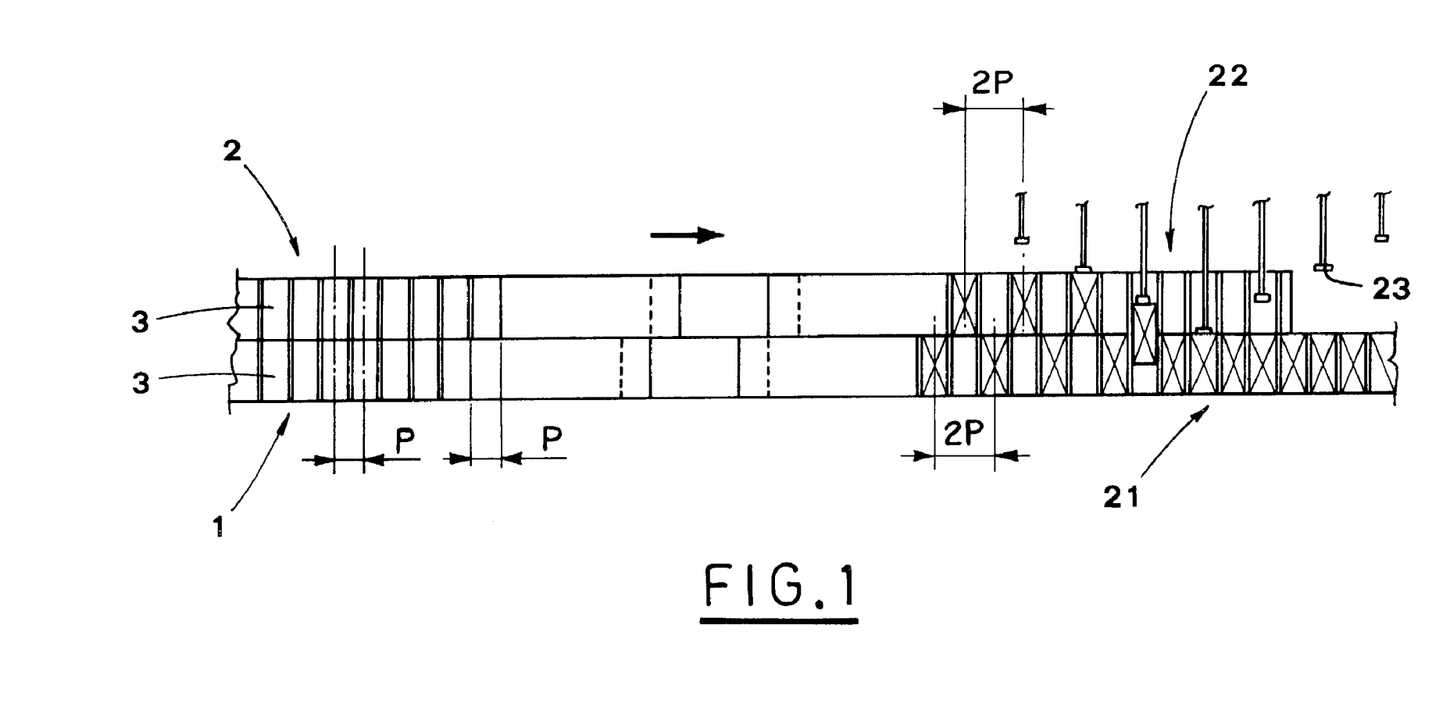
FIG. 1 shows a schematic plan view of working lines of the subject apparatus.
Figure 2:
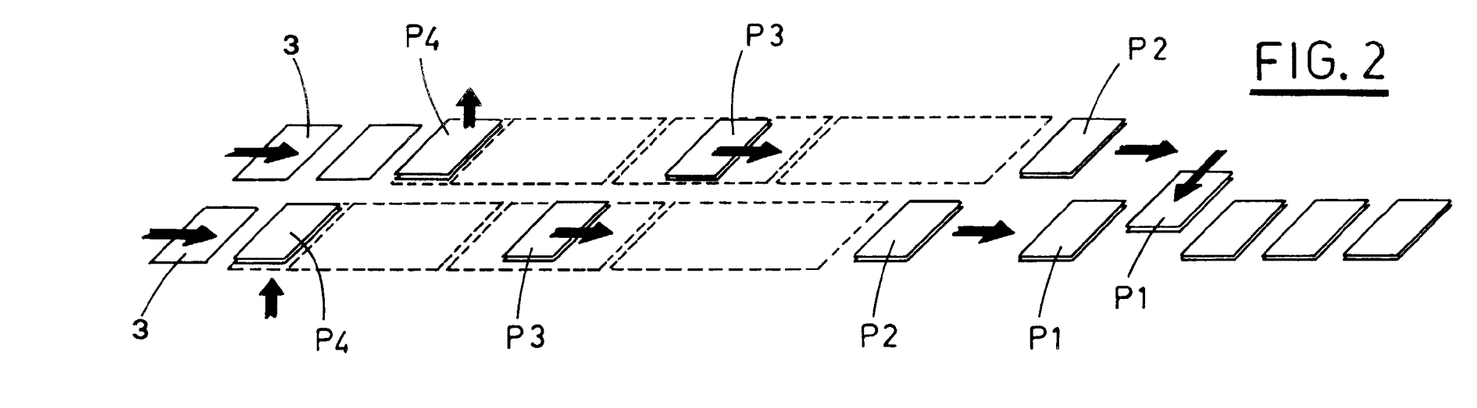
FIGS. 2, 3, 4 and 5 show schematic perspective views of steps of the subject method.
Figure 3:
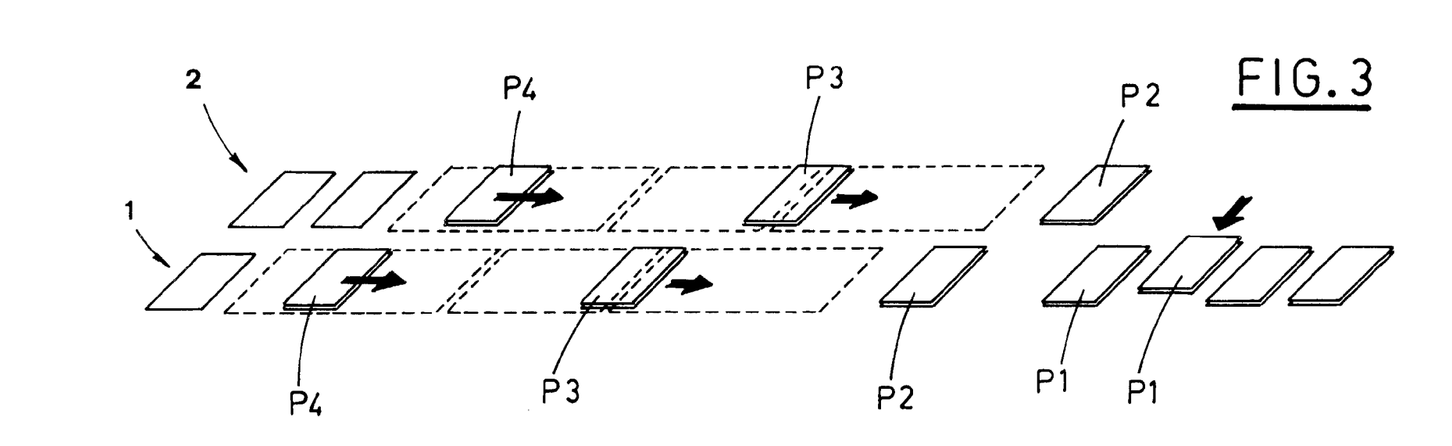

With reference to FIGS. 1, 2, 3, a first and a second working line of the apparatus have been indicated with 1 and 2.

The blister packs 3 to be packaged, arranged in rows and fed by not illustrated means, are moved forward along the working lines 1, 2.

The feeding means are situated upstream of the said working lines 1, 2, at the outlet of the blister band cutting station.

In each row, the middle line of each blister pack 3 is spaced apart from the middle line of the precedent blister pack by a pre-fixed step P and is aligned transversally with a corresponding blister pack 3 of the row beside.

The working lines 1, 2, equipped with respective conveying belts 4, lead to the above mentioned blister packs piling stations 5.

Each piling station 5 is provided with an elevator 6, operated by not illustrated sensor means, which reciprocates along a vertical axis, so as to withdraw the blister packs 3 going out from the feeding belt 4 and raise them so that they form a pile.

According to the subject method, piles of a predetermined number of blister packs 3 are formed in the said stations 5 during a piling step.

When a pile is completed, a next step begins, in which the said pile is taken over from the piling station 5 by first conveying means 8 and brought, in a suitable time relation, to second conveying means 12, situated downstream of the first ones.

Next, the same pile is conveyed and brought to third conveying means 16, situated downstream of the second conveying means 12 and aimed at introducing the said pile into corresponding tray holders 20 of a line 21, 22 located at the outlet of the third conveying means 16.

According to the method, the time relation between the second conveying means 12 and the third conveying means 16, and between the third conveying means 16 and the tray holders line 21, 22 is such that a full holder follows an empty holder, and so on.

As a consequence, the distance between the middle line of a pile situated on each one holder line 21, 22 and the middle line of a precedent pile is equal to twice a step P, as indicated with 2P in FIG. 1.

The staggering of the piling stations 5 of the working lines 1, 2 determines a corresponding staggering of the relative tray holders lines 21, 22, such that each holder 20 of the lines containing a pile is transversally aligned with an empty holder of the line beside.

Finally, the method includes a transferring step, during which pushers 23, acting transversally to the holder lines 21, 22, transfer the piles from the holder line 22, whose inlet is located in a more advanced position, to empty holders of the line 21 beside.

In this way, a series of piles of blister packs 3 is obtained, arranged in a single row and later introduced into cases, that occurs in the region of a packaging station situated downstream of the pushers 23.

If the blister packs 3 are fed regularly to the working lines 1, 2, the steps of the subject method will be synchronised downstream of each of these lines, as seen in FIGS. 2, 3, 4 and 5.

Moreover, the time relation between the different conveying means allows more piles of blister packs 3 formed subsequently to undergo respective working steps on different conveying means.

In FIGS. 2, 3, 4 and 5, the indications P1, P2, P3, P4 indicate the piles of blister packs 3 as they are formed along each working line.

In particular, in the situation illustrated in FIG. 2, the forward pile P1 is being introduced in an empty space of the holders line 21, before the corresponding pile P1 located behind; the piles P2 have been brought to the holders lines 21, 22 by the third conveying means 16; the piles P3 are being conveyed by the second conveying means 12; the piles P4 have been completed in the piling stations 5.

In the situation illustrated in FIG. 3, the piles P1 have been set in a single longitudinal row; the piles P2 move forward to the respective holders lines 21, 22; the piles P3 are being brought from the second conveying means 12 to the third conveying means 16; the piles P4 are taken over the piling stations 5 by the first conveying means 8.

Figure 4:
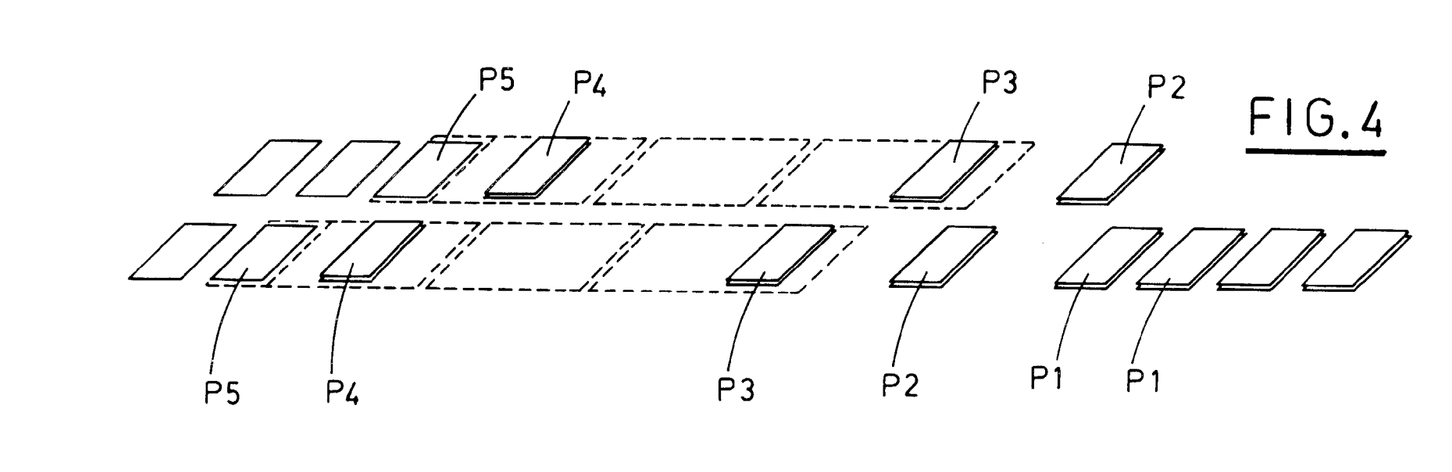

In the situation illustrated in FIG. 4, the arrangement of the piles P1 is already completed; the piles P2 move forward to the respective holders lines 21, 22; the piles P3 are about to be delivered to the respective holders lines 21, 22 by the third conveying means 16; the piles P4 move forward on the first conveying means 8; a subsequent pile P5 is being formed in the piling stations 5.

Figure 5:
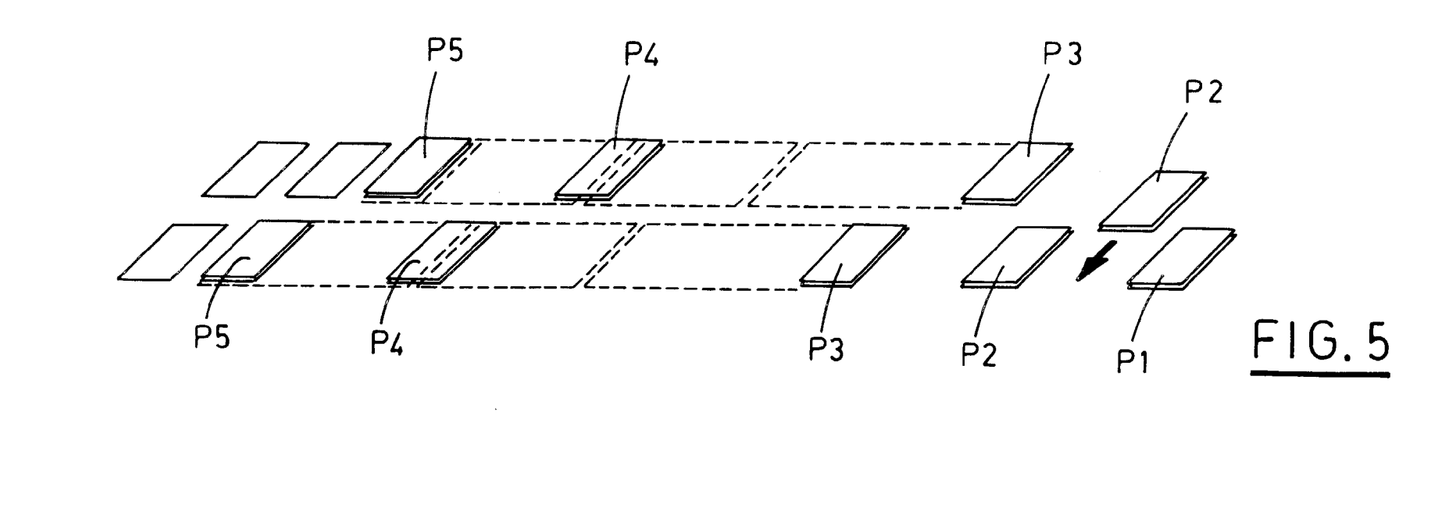

In the situation illustrated in FIG. 5, the introduction of the most advanced pile P2 into the empty space before the corresponding pile P2, located behind, has begun; the piles P3 have been delivered to the respective holders lines 21, 22; the piles P4 are brought from the first conveying means 8 to the second conveying means 21; the formation of the piles P5 in the piling stations 5 has been completed.

The steps sequence of the subject method is always the same and does not depend on the number of blister packs 3 in each pile.

Obviously, the activation of the first conveying means 8 is periodically suspended until a pile is completed in the stations 5; speed of the second conveying means 12, of the third conveying means 16 and of the holders lines 21, 22 are adjusted in accordance with the time required to complete the piles.

The first conveying means 8, parallel to the working lines 1, 2, include flexible means 9 which turn around wheels 10 and are provided with a series of prongs 11, regularly spaced apart.

The prongs 11 moves over a sliding surface 7 so as to push the piles of blister packs 3 on the same surface 7.

The sliding surface 7 includes rails which support the piles of blister packs 3.

The second conveying means 12, situated downstream of the first conveying means 8, below the sliding surface 7, are formed by flexible means 13 which are mounted on wheels 14 and are provided with a series of prongs 15, regularly spaced apart.

The prongs 15 move under the sliding surface 7 and protrude upward therefrom so as to push forward the piles of blister packs 3 on the same surface 7 in suitable time relation with the movement of the first conveying means 8.

Also the third conveying means 16, situated downstream of the second conveying means 12 and over the sliding surface 7, include flexible means 17 mounted on wheels 18 and are provided with two prongs 19, regularly spaced apart.

The prongs 19 moves along the sliding surface 7, so as to push forward the piles of blister packs 3 along the same surface 7.

The tray holders lines 21, 22, fed by the third conveying means 16, are formed by a conveying belt 24, provided with plates 25, regularly spaced apart, which delimits between one another the above mentioned tray holders 20 for the piles of blister packs 3.

The transversal pushers 23, which arrange the piles of blister packs 3 along a single line, are moved across these trays 20.

The pushers 23 are moved along a path parallel to the holder line, in synchrony with the conveying belts 24 operated in continuous motion.

Woking of the apparatus will be described in the following, with reference to FIGS. 6, 7, 8, 9 (in which the arrows indicate the means while moving in the step concerned), beginning with a step in which the blister packs 3 are collected and piled in the station 5 situated along the first working line 1.

The second working line 2, staggered by one step in the region of the piling station 5, includes the same means of the first working line 1 and therefore works in the same way.

The blister packs 3, regularly fed by the conveying belt 4, are taken over by the elevator 6 and raised to the sliding surface 7, in particular, to a position (indicated with P4 in FIG. 6) located substantially at the entrance of the first conveying means 8. The pile of blister packs 3 is formed in the position P4. In the illustrated case, the pile is formed by two blister packs 3.

Figure 6:
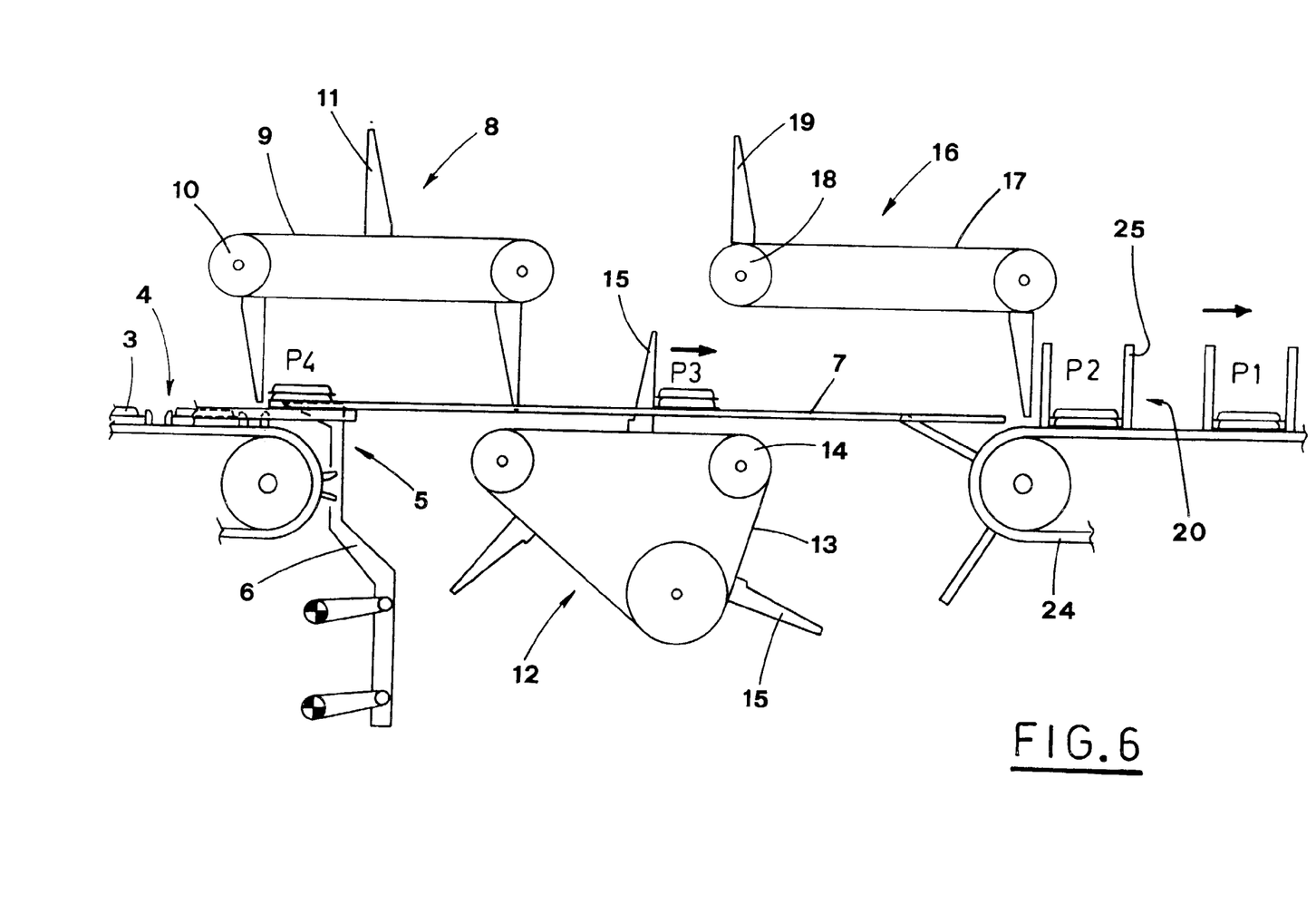
FIG. 6 shows a lateral view of the above mentioned apparatus, during the articles withdrawing and piling steps.

Simultaneously, the previously formed pile P3 is located near the second conveying means 12 that moves it forward on the sliding surface 7.

Other previously formed piles P2 and P1 have already reached the tray holder line 21 and occupy respective holder 20 (see still FIG. 6).

Figure 7:
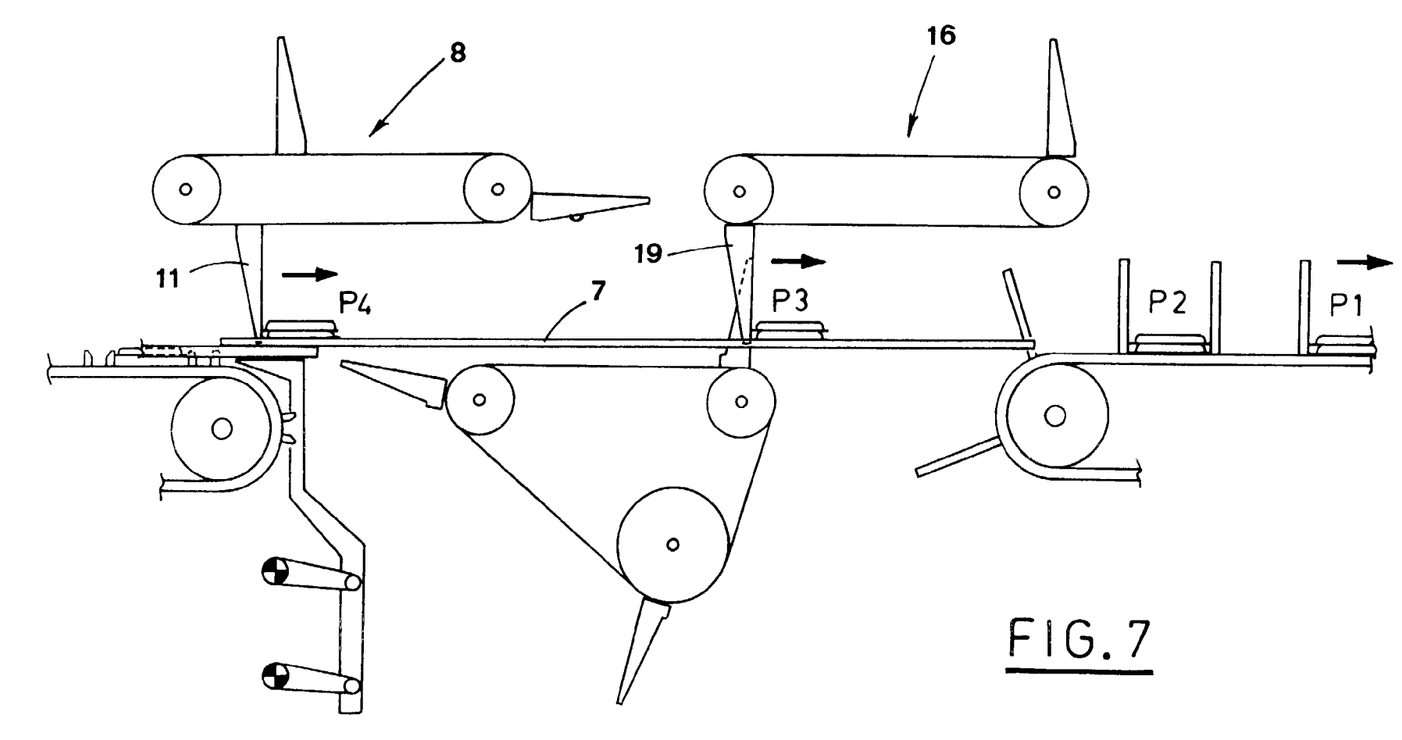
FIGS. 7, 8, and 9 show the same lateral view of the apparatus, in subsequent working steps.

When the pile formation in position P4 has been completed, the first conveying means 8 are operated and move, by means of a prong 11, the same pile along the sliding surface 7 (see FIG. 7).

Simultaneously, the precedent pile P3 is moved to the third conveying means 16 which are operated in suitable time relation, so as to engage the same pile by means of a prong 19 and continue its movement on the sliding surface 7.

Figure 8:
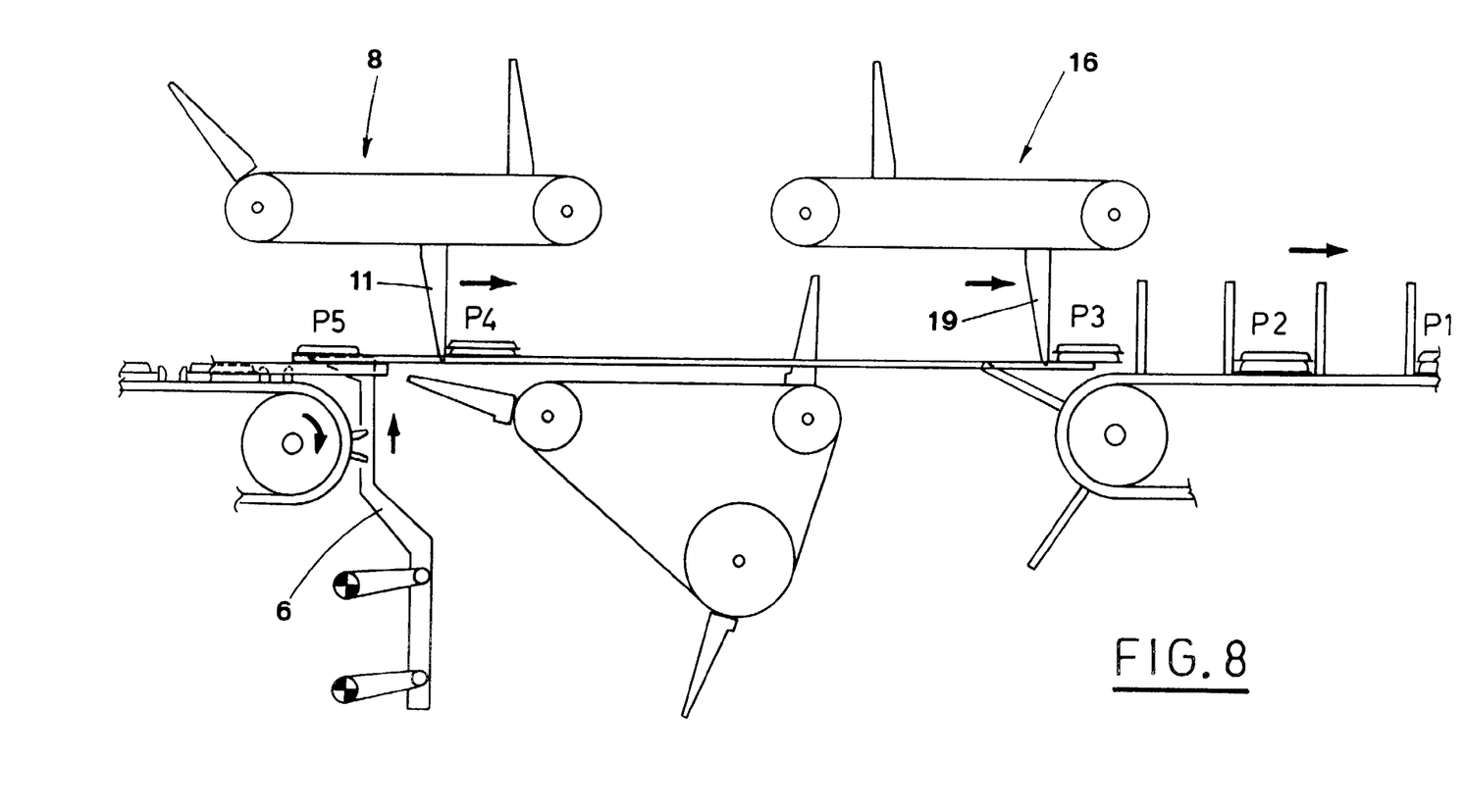

During the said step, in which the piles P4 and P3 are moved on the sliding surface 7 by the third conveying means, the elevator 6 reciprocates in the piling station 5 and makes another pile of blister packs 3 in the position indicated with P5 in FIG. 8.

Figure 9:
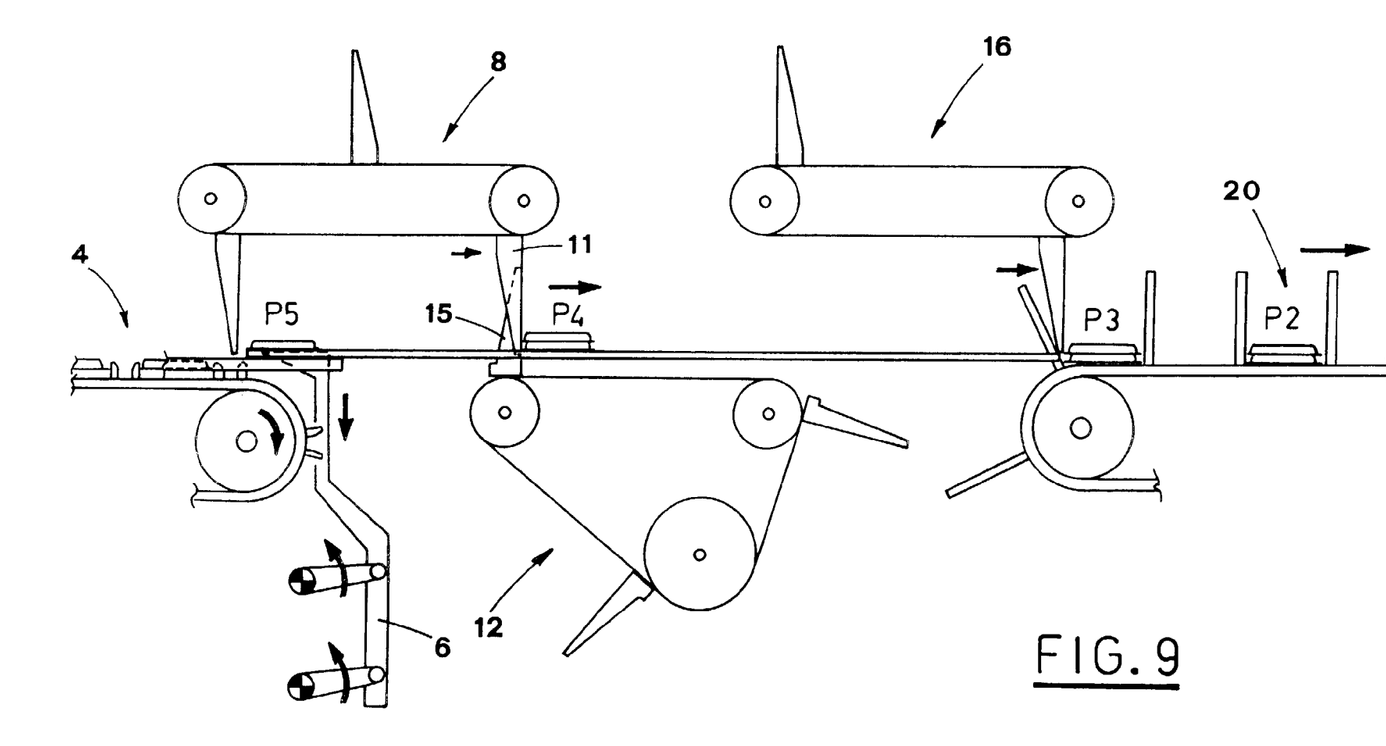

Meanwhile, due to the movement of the first conveying means 8, the pile P4 is transported to the second conveying means 12, which are, in their turn, operated in suitable time relation so as to engage the same pile P4 with the prong 15 and continue to move it on the sliding surface 7 (FIG. 9).

Simultaneously, the third conveying means 16 moves the precedent pile P3 to the tray holders line 21 and introduce it into a related holder 20 thereof.

It is to be noted that the distance 2P between the middle line of the piles of blister packs introduced into the holders 20 is twice a step P, i.e. each empty holder is followed by a full one.

The above described working steps are repeated in the same way in both tray holders lines 21, 22, that are arranged side by side. Consequently, the piles introduced in the holders 20 of one line are staggered by one step P with respect to the line beside.

In other words, the piles introduced into the holders 20 of the second tray holders line 22 face the empty holders of the first holder line 21.

As has been already said, operation of the pushers 23 cause transfer of the piles from the second holders line 22 to the empty holders of the first line 21.

Therefore, at the outlet of the first line 21, the piles of blister packs to be packaged are aligned in one regular row.

Figure 15:
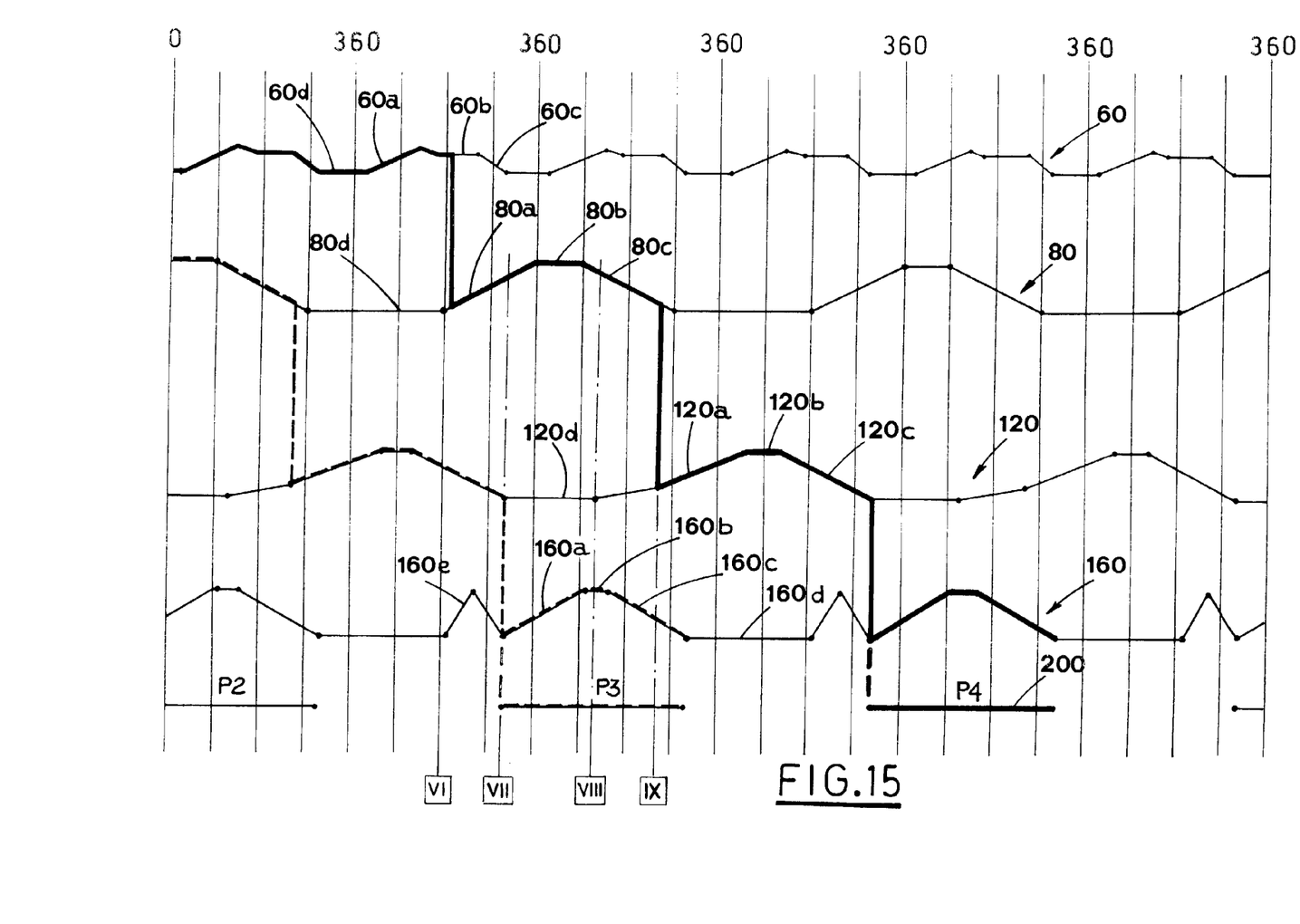
FIGS. 15 and 16 show schematically the working cycle of the elements of the subject machine, respectively in case of regular functioning and in the above mentioned case, in which an articles has not been fed.

The diagram of FIG. 15 makes clearer the reciprocal time relation between the above mentioned conveying means.

The lines indicated with 60, 80, 120 and 160 show the working cycle of the elevator 6 and of the conveying means 8, 12 and 16, respectively.

The Roman numerals VI, VII, VIII and IX indicate the working steps corresponding to the previously described FIGS. 6, 7, 8 and 9, respectively.

More precisely, the working cycle of the elevator 6 is a sequence of steps including, beginning from the lowered position 60d, a rise step 60a, a dwell step 60b in raised position 60b, and descend step 60c.

The working cycle of the first conveying means 8 begins from the standstill step 80d, followed by acceleration step 80a, uniform movement step 80b and slowing down step 80c.

The acceleration step 80a of the first conveying means 8 begins in suitable time relation with the elevator 6 working cycle.

In particular, this acceleration step 80a begins together with the dwell step 60b in which the elevator stays in the raised position in the piling station 5.

The duration of a complete cycle of the conveying means 8, including the standstill step 80d, is such that a complete pile, of a desired number of blister packs 3, can be formed.

In the described example, the elevator 6 raises two blister packs during the said cycle of the conveying means 8.

The working cycle of the second conveying means 12 begins from the standstill step 120d, followed by acceleration step 120a, uniform movement step 120b and slowing down step 120c.

This cycle is in suitable time relation with the first conveying means 8 working cycle.

In normal working conditions, the duration of a complete cycle of the second conveying means 12, including the standstill step 120d, is equal to the duration of the first conveying means 8 working cycle.

The working cycle of the third conveying means 16 begins from the standstill step 160d, followed by acceleration step 160a, uniform movement step 160b and slowing down step 160c. This cycle is in suitable time relation with the second conveying means 12 working cycle.

In practice, the acceleration step 160a of the third conveying means 16 begins when the slowing down step 120c of the second conveying means 12 is over.

The said acceleration step 160a is preceded by an impulsive movement step 16e, necessary for the prongs 19 of the conveying means 16 to take a position in which it engages the pile to be transported.

The sections 200 of FIG. 15 indicate the steps in which the holders 20 of the lines 21, 22, that are to receive the piles, pass in synchrony with the active steps of the third conveying means 16 working cycle.

Continuous line in the same diagram of FIG. 15 indicates the transferring cycle of the pile P4, beginning from the formation of the same pile by the elevator 6 of the piling station 5.

As clearly seen, the conveying means 8, 12 and 16 work in subsequent movement steps in such a way as to make the pile P4 move almost continuously.

The Broken line indicates the transferring cycle of the precedent pile P3, seen only in part. The transferring cycles of the pile P3 and of the pile P4 are identical.

Therefore, the subject method and apparatus permit to take over and pile the blister packs 3 produced in multiple rows and to convey the so obtained piles of blister packs to the packaging line, where the piles arrives arranged in a single row.

Figure 10:
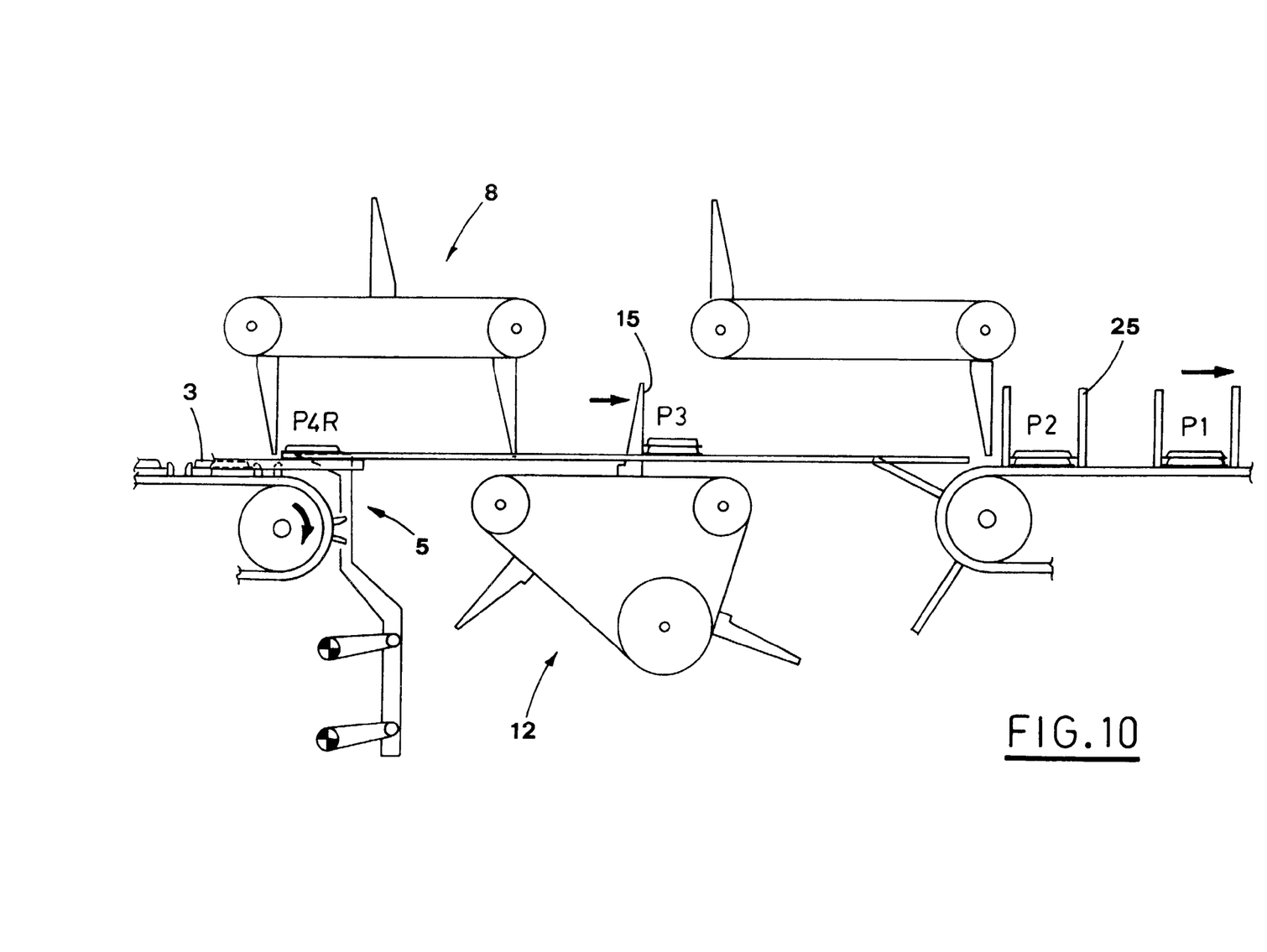
FIGS. 10, 11, 12, 13, and 14 show the same lateral view of the apparatus, in subsequent working steps, in case an article has not been fed.

If one blister pack is missing on the feeding belt 4 of a working line 1 or 2 (see FIGS. 10, 11, 12, 13, 14, in which the arrows indicate the moving means in the step concerned), the pile formed in the related piling station 5 will be incomplete, as indicated with P4R of FIG. 10 (for comparison, see the corresponding regular situation, shown in FIG. 6). This situation is detected by known sensor means, not shown, and the first conveying means 8 are stopped, so that the incomplete pile does not move, while the subsequent conveying means 12 and 16 continue to work regularly (FIG. 11).

Figure 11:
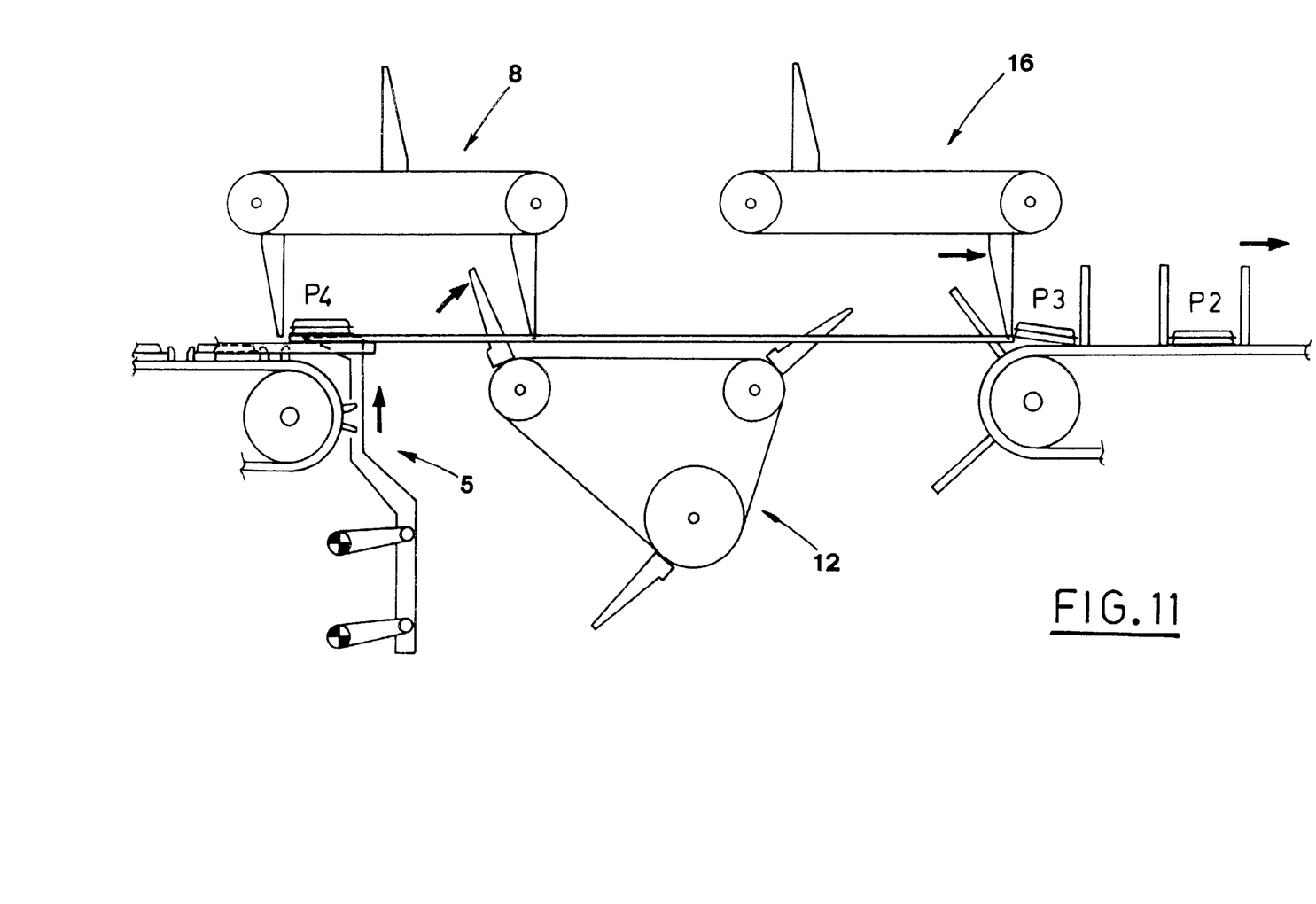

The first conveying means 8 remain standstill for the time sufficient for the working line to move forward by one step so as to complete the pile with the blister pack fed by the piling station (see again FIG. 11).

Figure 12:
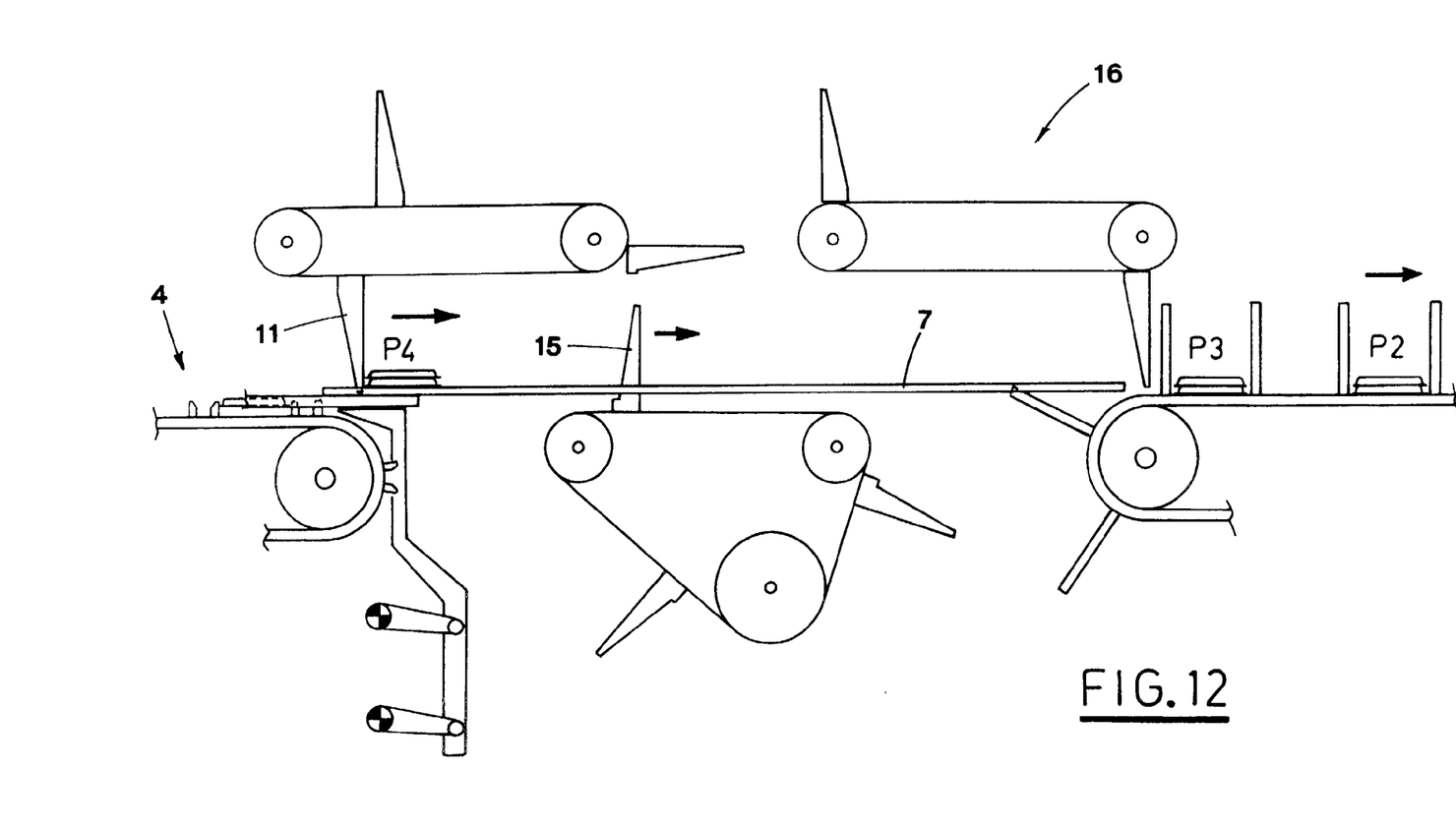

After the unfinished pile has been completed in position P4, the first conveying means 8 are operated again in time relation with the stepwise movement of the subsequent conveying means 12, 16, so as to move the same pile on the sliding surface 7 (FIG. 12).

It is to be noted that during this step the second conveying means 12 perform an idle cycle, corresponding to the lack of the pile, not fed by the first conveying means 8, while the third conveying means 16 complete the regular transfer of the precedent pile P3 to the related tray holders line 21 or 22.

Figure 13:
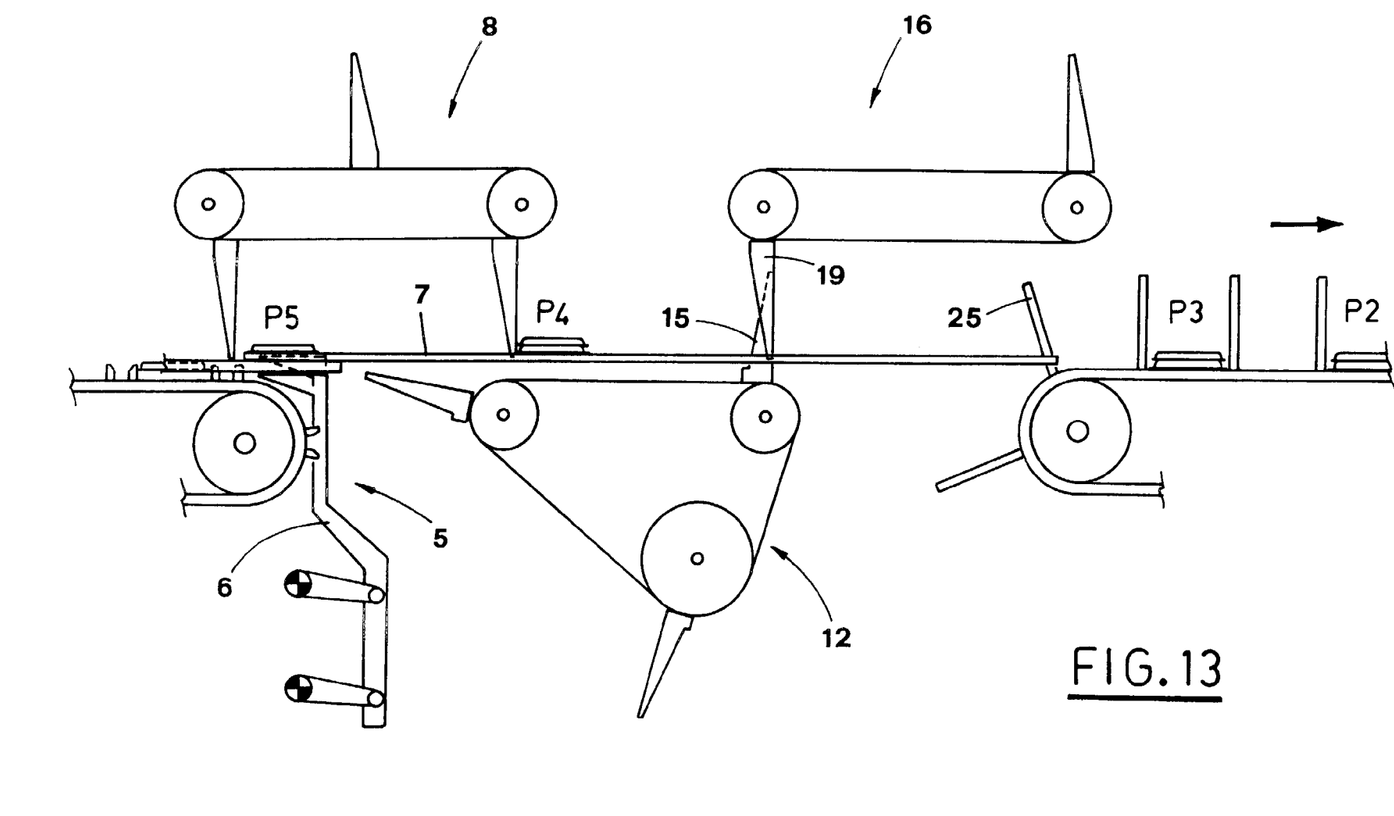

Afterwards, the pile P4 is transferred, in the already seen way, to the second conveying means 12, that are ready for a new working cycle after having completed the idle cycle (FIG. 13).

Figure 14:
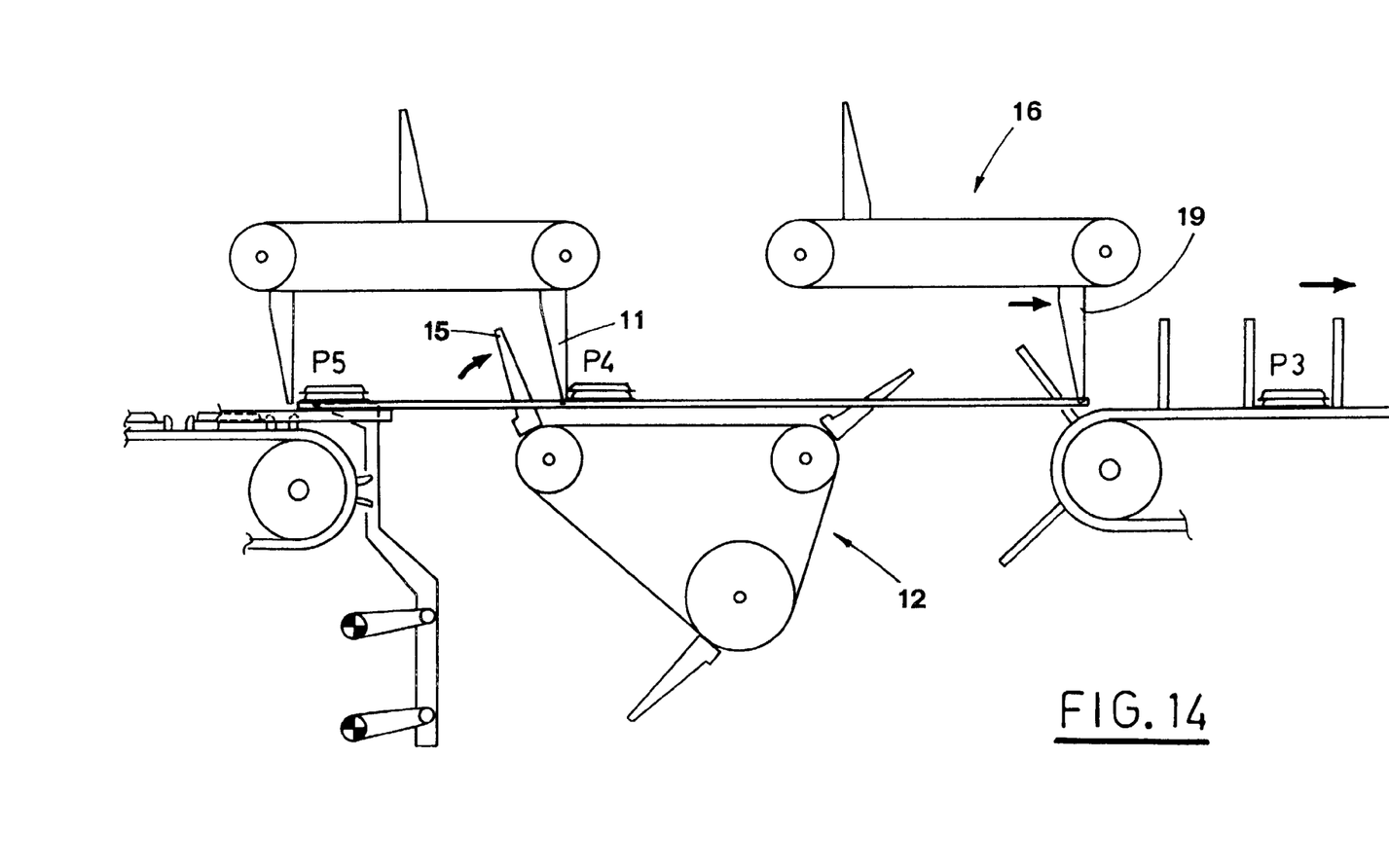

The third conveying means 16, linked in operation with the other conveying means, perform an idle cycle in which the missing pile would be forwarded. Obviously, this results in an empty holder 20 in the packaging line (FIG. 14).

Figure 16:
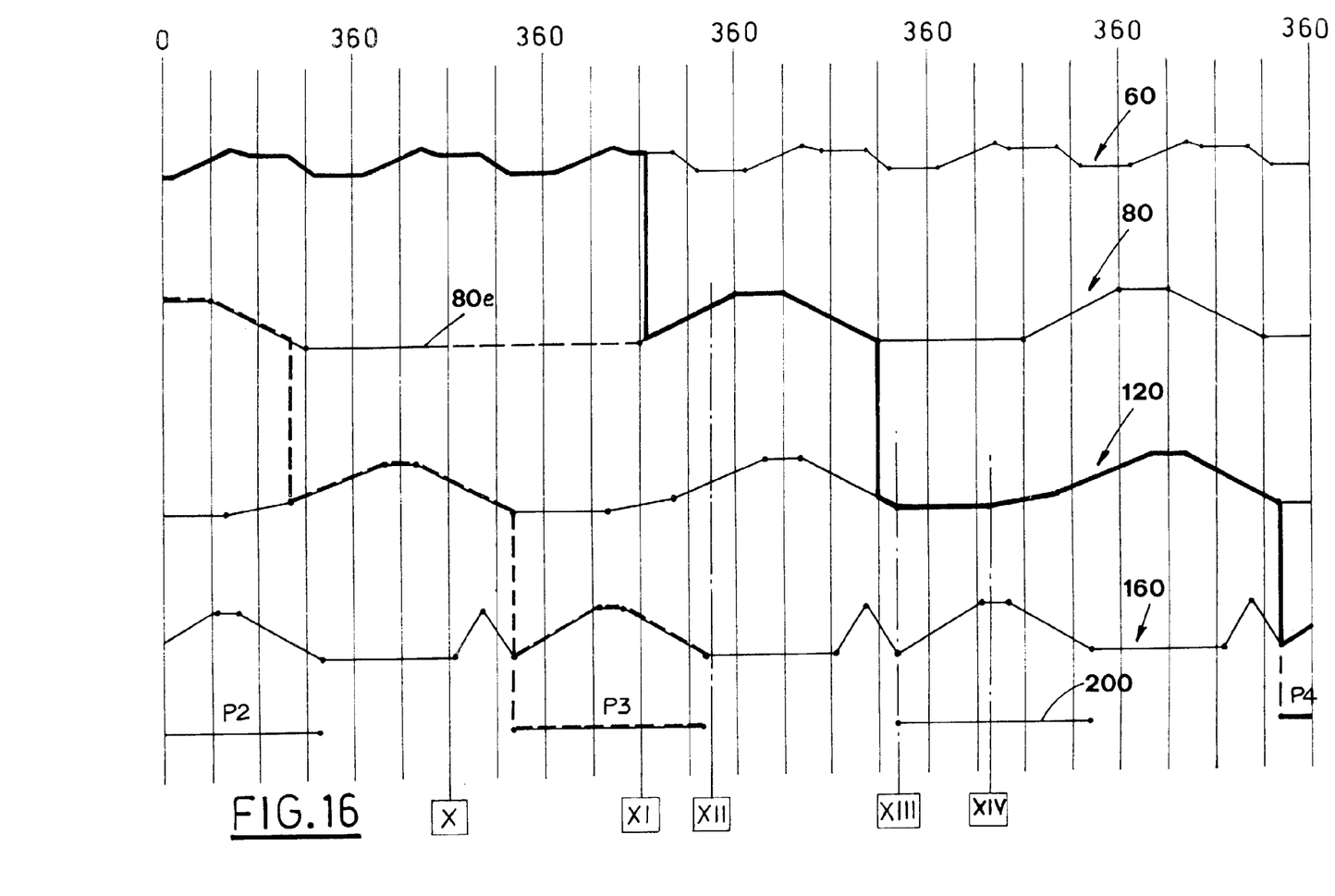

The diagram of FIG. 16 illustrates the reciprocal time relation between the above mentioned conveying means, when one blister pack lacks in the feeding belt 4.

In this diagram, the Roman numerals X, XI, XII, XIII and XIV indicate the working steps corresponding to the aforementioned FIGS. 10, 11, 12, 13 and 14, respectively.

In particular in this case, the working cycle of the first conveying means 8 features a step 80e in which the standstill step is prolonged for a time necessary to complete the pile after an additional raising cycle of the elevator.

It is to be noted that the first conveying means 8 resume working in the correct time relation with the elevator 6 working cycle, however the time relation with other conveying means 12 and 16 is changed.

Nevertheless, this change does not compromise the correct working of the apparatus, according to the disclosed method.

In practice, the lack of one blister pack causes the change of the time relation between the first conveying means 8 and further conveying means 12 and 16.

This new time relation is maintained during the subsequent regular working of the apparatus, until the lack of another blister pack changes it again.

Consequently, with the described method and apparatus blister packs are always timely taken over, piled and transferred to the packaging line no matter of possible faulty packs rejection.

In particular, complete packs of these piles are formed, even if one or more blister pack were missing in the feeding step, without interrupting the normal operating cycle of the working line.

What is claimed is:

1. Method for taking over and piling articles supplied in a plurality of rows and for transferring obtained piles of articles to a packaging line characterised in that it includes the following steps:

moving the articles (3) to be packaged along at least two working lines (1, 2) arranged side by side and parallel to each other;

piling said articles (3) in related piling stations (5) which are staggered by one step (P) equal at least to the distance between the middle lines of two subsequent articles;

detecting the moment when a pile of articles (3) is complete in each piling station (5);

activating conveying means (8, 12, 16) independent for each piling station (5) for transferring a piles of articles (3) to a packaging line (21, 22), the piles (3) being still arranged in two parallel rows but with the middle lines of subsequent rows spaced out by twice said step (P);

arranging said piles of articles (3) in one single row by transverse transferring of the piles of one row into empty spaces among the piles of the other row.

2. Method, according to claim 1, characterised in that it includes:

transferring of said piles of articles (3), having their middle lines spaced out by twice said step (P), to tray holders lines (21, 22), first and second respectively, which are arranged parallel and side by side and aligned with said working lines (1, 2) respectively, and which are equipped with tray holders (20) into which said piles are to be introduced, said piles of articles (3) being spaced out, with reference to their middle lines, by a double step (2P) along each tray holders line (21, 22) so that a full holder follows an empty holder; transferring said piles of articles (3) from said second holder line (22) to empty holders of said first tray holders line (21), by means of pushers (23) acting transversally to said tray holder lines (21, 22).

3. Apparatus for taking over and piling articles supplied in a plurality of rows and for transferring obtained piles of articles to a packaging line characterised In that it includes:

at least two working lines (1, 2), arranged parallel and side by side, provided with means (4) for feeding the articles (3) to be packaged;

means (6) for piling the same articles (3) in related piling stations (5) which are located at the end of said working lines (1, 2) and staggered by one step (P) equal at least to the distance between the middle lines of two subsequent articles;

sensor means for detecting a complete pile of article (3) being formed in each piling station (5);

means (8, 12, 16) for conveying complete piles of articles (3), arranged in two parallel rows and with their middle lines spaced out of twice said step (P), to a packaging line;

transverse transferring means for transferring piles of articles (3) from one row to the empy spaces between the piles of the other row.

4. Apparatus, according to claim 3, characterised in that said conveying means include first conveying means (8), which are operated stepwise, to move the complete pile from said piling means (5); and further conveying means (12, 16) operated in sequence, in suitable time relation with said first conveying means (8), to transfer said pile of articles (3), moved by said first conveying means (8), to said packaging line (21, 22).

5. Apparatus, according to claim 4, characterised in that said sensor means detect when a pile of articles (3) is not complete in said piling means (5), and keep said first conveying means (8) stopped until said pile of the articles (3) is completed.

6. Apparatus, according to claim 4, characterised in that the first conveying means (8) and said further conveying means (12, 16) include flexible means (9, 13, 17) operated stepwise along a ring-like path and provided with a series of prongs (11, 15, 17) regularly spaced apart for engagement of said piles of articles (3) resting on a sliding surface (7), to convey said pile to said packaging line (21, 22).

7. Apparatus, according to claim 4. characterised in that said conveying means include second conveying means (12) and third conveying means (16) arranged in sequence and operated stepwise in suitable time relation so as to transfer said piles of articles (3) to said packaging line (21, 22).

8. Apparatus, according to claim 7, characterised in that said third conveying means (16), situated downstream of said second conveying means (12), introduce said piles of articles (3) into holders (20) of a related packaging line (21, 22) placed at the outlet of said third conveying means (16), with said piles staggered by a double step (2P) along said packaging line (21, 22).

* * * * *